(12) United States Patent
Kim

(10) Patent No.: US 9,766,018 B2
(45) Date of Patent: Sep. 19, 2017

(54) METAL HEAT STORAGE APPARATUS

(71) Applicant: Byunggyun Kim, Busan (KR)

(72) Inventor: Byunggyun Kim, Busan (KR)

(*) Notice: Subject to any disclaimer, the term of this patent is extended or adjusted under 35 U.S.C. 154(b) by 96 days.

(21) Appl. No.: 14/415,641

(22) PCT Filed: Jan. 10, 2014

(86) PCT No.: PCT/KR2014/000321
§ 371 (c)(1),
(2) Date: Jan. 19, 2015

(87) PCT Pub. No.: WO2014/126342
PCT Pub. Date: Aug. 21, 2014

(65) Prior Publication Data
US 2015/0308751 A1    Oct. 29, 2015

(30) Foreign Application Priority Data
Feb. 18, 2013    (KR) .................. 10-2013-0017182

(51) Int. Cl.
*F28D 19/00*    (2006.01)
*F28D 20/02*    (2006.01)
(Continued)

(52) U.S. Cl.
CPC .............. *F28D 20/02* (2013.01); *F24J 2/067* (2013.01); *F24J 2/07* (2013.01); *F24J 2/08* (2013.01);
(Continued)

(58) Field of Classification Search
CPC ............... F28D 20/021; F28D 20/0056; F28D 20/0043; F28D 2020/0086; F24J 2/067;
(Continued)

(56) References Cited

U.S. PATENT DOCUMENTS 3,450,192 A * 6/1969 Hay .......................... F24F 5/00
126/628
4,235,221 A * 11/1980 Murphy .................... F03G 6/00
126/562
(Continued)

FOREIGN PATENT DOCUMENTS

CN    101105342    1/2008
JP    2011-089741    5/2011
(Continued)

OTHER PUBLICATIONS

International Search Report Dated May 28, 2014 From the Korean Intellectual Property Office Re. Application No. PCT/KR2014/000321 and Its Translation Into English.
(Continued)

*Primary Examiner* — Len Tran
*Assistant Examiner* — Claire Rojohn, III

(57) ABSTRACT

A metal heat storage apparatus comprises a metal heat storage medium, a medium insertion chamber insulating the inner side, outer side and the floor of the metal heat storage medium; an outer wall structure made of concrete further insulating the metal heat storage medium and including a floor, a central column, an outer wall body, and an upper cover; an infrared ray reflecting mirror disposed below the upper cover constituting the outer wall structure and reflecting infrared rays generated from the metal heat storage medium; a heat exchanger spirally disposed inside the metal heat storage medium and including supply and drain tubes exposed to the outside of the outer wall structure; a solar heater buried in the metal heat storage medium; and a high-density optical input port passing through the outer wall body and the insulating outer wall to provide solar energy to the solar heater.

6 Claims, 4 Drawing Sheets

(51) Int. Cl.
*F24J 2/10* (2006.01)
*F24J 2/34* (2006.01)
*F24J 2/06* (2006.01)
*F24J 2/07* (2006.01)
*F24J 2/08* (2006.01)
*F28D 1/047* (2006.01)
*F28D 20/00* (2006.01)
*F28D 7/02* (2006.01)

(52) U.S. Cl.
CPC . *F24J 2/10* (2013.01); *F24J 2/34* (2013.01); *F28D 1/0472* (2013.01); *F28D 20/0056* (2013.01); *F28D 20/021* (2013.01); *F28D 7/028* (2013.01); *Y02E 10/41* (2013.01); *Y02E 60/142* (2013.01); *Y02E 60/145* (2013.01); *Y02E 70/30* (2013.01)

(58) Field of Classification Search
CPC .......... F24J 2/08; F24J 2/34; F24J 2/51; F24J 2/515; F28F 2270/00
USPC ............................................... 165/10, 104.11
See application file for complete search history.

(56) References Cited

U.S. PATENT DOCUMENTS

| | | | | |
|---|---|---|---|---|
| 4,240,268 A * | 12/1980 | Yuan | ..................... | F24F 5/0046 126/400 |
| 4,326,501 A * | 4/1982 | Jardin | ........................ | F24J 2/34 126/400 |
| 4,449,515 A | 5/1984 | Nilsson, Sr. | | |
| 4,619,244 A * | 10/1986 | Marks | ........................ | F24J 2/02 126/582 |
| 5,217,000 A * | 6/1993 | Pierce-Bjorklund | ..... | E04B 1/74 126/621 |
| 5,274,497 A * | 12/1993 | Casey | ........................ | F24J 2/08 359/364 |
| 9,115,937 B2 * | 8/2015 | Perryman | ............. | F28D 20/021 |
| 9,605,877 B2 * | 3/2017 | Wu | ............................ | F24J 2/14 |
| 2001/0048985 A1 * | 12/2001 | Legare | ..................... | A62C 3/00 428/34.6 |
| 2004/0028904 A1 * | 2/2004 | Park | .................... | B28B 23/0087 428/402 |
| 2011/0192440 A1 * | 8/2011 | Wu | ............................ | F24J 2/14 136/244 |
| 2011/0226440 A1 | 9/2011 | Bissell et al. | | |
| 2012/0037150 A1 * | 2/2012 | Gheyri | ....................... | F24J 2/08 126/623 |
| 2013/0228303 A1 * | 9/2013 | Eskilsby | ............. | F24D 11/0221 165/4 |
| 2015/0308751 A1 * | 10/2015 | Kim | .......................... | F24J 2/10 165/10 |
| 2016/0109187 A1 * | 4/2016 | Houdek | .................... | F28F 1/40 165/10 |
| 2016/0223268 A1 * | 8/2016 | Quast | ........................ | F24H 7/02 |
| 2016/0320145 A1 * | 11/2016 | Bergan | ................ | F28D 20/0056 |
| 2017/0082407 A1 * | 3/2017 | Vandoninck | ............. | F41H 9/06 |

FOREIGN PATENT DOCUMENTS

| | | |
|---|---|---|
| KR | 20-0438245 | 2/2008 |
| KR | 10-2010-0116633 | 11/2010 |
| KR | 10-2012-0003202 | 1/2012 |
| WO | WO 2011/000522 | 1/2011 |
| WO | WO 2011/055306 | 5/2011 |
| WO | WO 2014/126342 | 8/2014 |

OTHER PUBLICATIONS

Kagn, Pan Soo.

\* cited by examiner

METAL HEAT STORAGE APPARATUS

RELATED APPLICATIONS

This application is a National Phase of PCT Patent Application No. PCT/KR2014/000321 having International filing date of Jan. 10, 2014, which claims the benefit of priority of Korean Patent Application No. 10-2013-0017182 filed on Feb. 18, 2013. The contents of the above applications are all incorporated by reference as if fully set forth herein in their entirety.

FIELD AND BACKGROUND OF THE INVENTION

The present invention relates to a metal heat storage apparatus used to store heat transmitted from the outside, and in particular, the present invention aims to provide a metal heat storage apparatus which stores, at a high temperature, high-temperature solar energy collected by means of a solar concentrator and such others, and allows a gradual discharge thereof, thereby significantly improving the storage of solar energy, i.e., natural energy.

A solar heat boiler obtains high-temperature solar energy by concentrating solar heat through use of a solar concentrator, and then stores and uses the obtained solar energy.

In general, the heat storage in the solar heat boiler is achieved by various methods. A solar hot water boiler disclosed in the publication of Korean Utility Application No. 20-1999-0036697 (Sep. 27, 1999) is provided as a representative example of the heat storage in the solar heat boiler. The configuration of the above solar hot water boiler is as follows. In the boiler including an electric heater installed therein, a reservoir which holds water is disposed within an outer case. A thermal insulation wall is formed by filling a thermal insulating material between the outer case and the reservoir. A water tube for supplying water is connected to one side of the lower portion of the reservoir. A collecting tube for collecting hot water which has circulated through each heating space is connected to the other side of the lower portion of the reservoir. A circulation pump which forcibly circulates the hot water is installed on the collecting tube. A water outlet tube for supplying water to each heating space requiring heating is connected to one side of the upper portion of the reservoir, so that one hot water tank is constituted. Further, the light collector is provided, which has the following structure. A lens which is installed in such a manner as to rotate with the axis of both frames on the outside of the building and collects solar heat. A solar tracking sensor is installed on one side of the lens. A driving motor which is interworked with the solar tracking sensor and rotates the lens in accordance with the angle of the sun is connected to one end of the rotational axis. A heat collecting plate including a heating tube therein is connected to the lens at the focus position of the lens by a support bar. Both ends of the heating tube and the upper and lower portions of the reservoir are connected with the circular tube. The circular tube which supplies the heated hot water to the reservoir is connected to the upper portion of the reservoir. The circular tube which transfers the hot water to be heated to the heat collecting plate is installed on the lower portion of the reservoir.

In the solar hot water boiler configured as such, after water is heated by the solar heat through the light collector, the hot water is stored in the reservoir surrounded by an insulating layer having an excellent heat insulating efficiency, and then is used as heating water and hot water, and particularly, the hot water is accumulated in the daytime and is used as the heating water at night. However, there are problems. For example, due to a low heat accumulation rate by directly heating the water, the hot water cannot be used for a long period of time. Therefore, the solar hot water boiler configured as such is difficult to actually use in winter and could not be practicalized.

A heat storage tank construction of the solar heat boiler disclosed in Registered Utility Model Publication No. (Y1) 20-0438245 (Feb. 1, 2008) has been provided as another example of the heat storage in the solar heat boiler. The heat storage tank construction of the solar heat boiler includes a heater which is installed to heat the heating water inside the heat storage tank body frame by using the heat transfer medium of the solar heat collector, and a heat exchanger for heating and supplying hot water, which is disposed on the inner upper portion of the body frame in such as to exchange heat with the water heated by the heater. The heater includes the first heating unit and the second heating unit. The first heating unit heats the heating water by winding the coiled tube around the heat exchanger disposed on the inner upper portion of the body frame. The second heating unit heats the heating water by winding the coiled tube around the inner lower portion of the body frame.

Through such a configuration, the heat transfer medium is heated by solar heat and then water is heated by using the heat transfer medium. The configuration has the advantages of obtaining higher heat accumulation rate than that of a method of simply heating the water. However, the volume of the heat storage tank is increased and the functionality is lost when cloudy weather continues.

PRIOR DOCUMENT

Patent document KR 2019990036697 U (Sep. 27, 1999)
Patent document KR 200438245 Y1 (Feb. 1, 2008)

SUMMARY OF THE INVENTION

Technical Problem

The present inventor has completed to overcome all the problems of the foregoing conventional heat storage apparatus. The present invention aims to provide a metal heat storage apparatus which stores, at a high temperature, high-temperature solar energy collected by means of a solar concentrator and such others, and allows a gradual discharge thereof, thereby significantly improving the storage of solar energy, i.e., natural energy.

Technical Solution

The present invention doubly insulates a metal heat storage medium, which stores solar energy at a high temperature (100 to 1300 Celsius degrees), and disposes a heat exchanger so as to be proximal to the metal heat storage medium, so that a working heating fluid can be heated for an extended period.

In order to doubly insulate the metal heat storage medium, a medium insertion chamber has an arrangement of an insulating inner wall, an insulating outer wall and an insulating floor on the inner side, outer side and the floor, respectively, of the metal heat storage medium. An outer wall structure, made of concrete, includes a floor, a central column, an outer wall body, and an upper cover; a mirror for reflecting infrared rays is disposed below the upper cover, and thereby allowing the loss of heat to be minimized.

The metal heat storage medium is composed of a block type in a casting state.

The inner insulating wall body 31 is configured by stacking an infrared reflective metal mirror, a high-density fire-proof thermal insulating material, a porous fire-proof thermal insulating material, and an excellently heat resistant fire-proof thermal insulating material. The infrared reflective metal mirror is disposed closer to the metal heat storage medium.

The outer wall structure uses fireproof cement and is made of concrete including a waterproof agent.

A fire-proof thermal insulating material is further disposed between the upper cover of the outer wall structure and the infrared rays reflecting mirror installed below the upper cover. The fire-proof thermal insulating material is light and has an aerogel type.

The high-density optical input port includes a high temperature insulating pipe, a convex lens, and a reflective metal parabolic mirror, wherein the high temperature insulating pipe is installed to pass through the outer wall structure and the inner insulating wall body so as to be coupled to the solar heater, wherein the convex lens is coupled to the front end of the high temperature insulating pipe, and wherein the reflective metal parabolic mirror is installed at the focal position of the convex lens inside the high temperature insulating pipe and includes a through-hole formed in the center thereof.

Advantageous Effects

According to the metal heat storage apparatus provided by the present invention, the metal heat storage medium is provided in a casting state. The outside of the metal heat storage medium is doubly insulated by using an inner insulating wall body and concrete, so that the loss of heat can be completely prevented. Particularly, the high-temperature solar energy collected by means of a solar concentrator and such others is stored at a high temperature and is allowed to be gradually discharged, so that the metal heat storage apparatus can be applied to a solar heat boiler.

Accordingly, when the solar heat boiler is configured according to the embodiment of the present invention, it is possible to obtain an effect that heating in winter is stably performed by using the solar energy, i.e., natural energy.

DESCRIPTION OF SPECIFIC EMBODIMENTS OF THE INVENTION

Hereafter, an embodiment of a metal heat storage apparatus provided by the present invention will be described with reference to the accompanying drawings.

Figure 1:
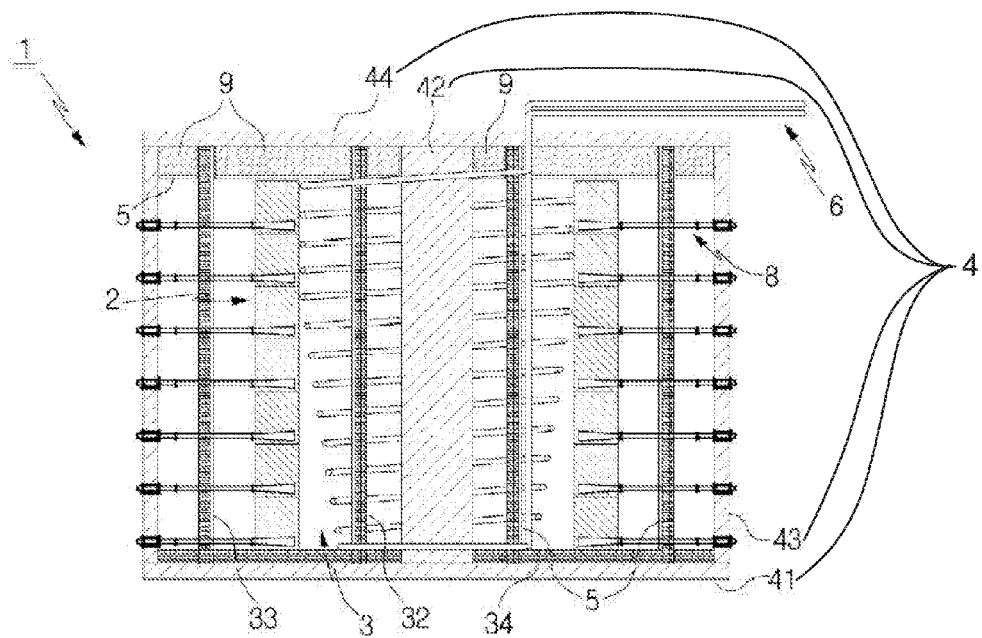
FIG. 1 is a front cross-sectional view showing an exemplary embodiment of a ring-type metal heat storage apparatus which is provided by the present invention and is used in steam power generation of about 1000 KW.
Figure 2:
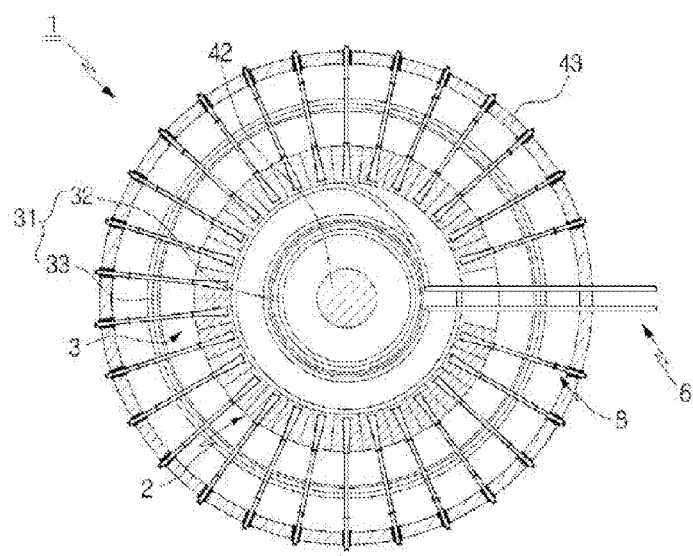
FIG. 2 is a plan cross sectional view of FIG. 1.

FIG. 1 is a front cross-sectional view showing an exemplary embodiment of a ring-type metal heat storage apparatus which is provided by the present invention and is used in steam power generation of about 1000 KW. FIG. 2 is a plan cross sectional view of FIG. 1.

The present invention particularly provides a metal heat storage apparatus 1 capable of storing at a high temperature (200 to 1300 degrees) heat energy concentrated by using the solar concentrator, etc.

The metal heat storage apparatus 1 includes: a metal heat storage medium 2 which is disposed in a ring type; a medium insertion chamber 3 is formed by disposing an insulating inner wall 32, an insulating outer wall 33 and an insulating floor 34, each of which is made of an inner insulating wall body 31 so as to insulate the metal heat storage medium 2, on the inner side, outer side and the floor, respectively, of the metal heat storage medium 2; an outer wall structure 4 which is made of concrete to insulate the metal heat storage medium 2 again and includes a floor 41, a central column 42, an outer wall body 43, and an upper cover 44; a infrared rays reflecting mirror 5 which is disposed below the upper cover 44 constituting the outer wall structure 4 and reflects infrared rays generated from the metal heat storage medium 2; a heat exchanger 6 which is spirally disposed inside the metal heat storage medium 2 and includes a supply tube 61 and a drain tube 62 which are exposed to the outside of the outer wall structure 4; a solar heater 7 which is buried in the metal heat storage medium 2; and a high-density optical input port 8 which is installed to pass through the outer wall body 43 and the insulating outer wall 33 so as to provide the solar energy to the solar heater 7.

In order to store the heat energy at a high temperature as described above, the metal heat storage medium 2 is required which can withstand the high temperature. The present invention provides the metal heat storage medium 2 which is manufactured at a low cost and capable of withstanding the high temperature.

Figure 3:
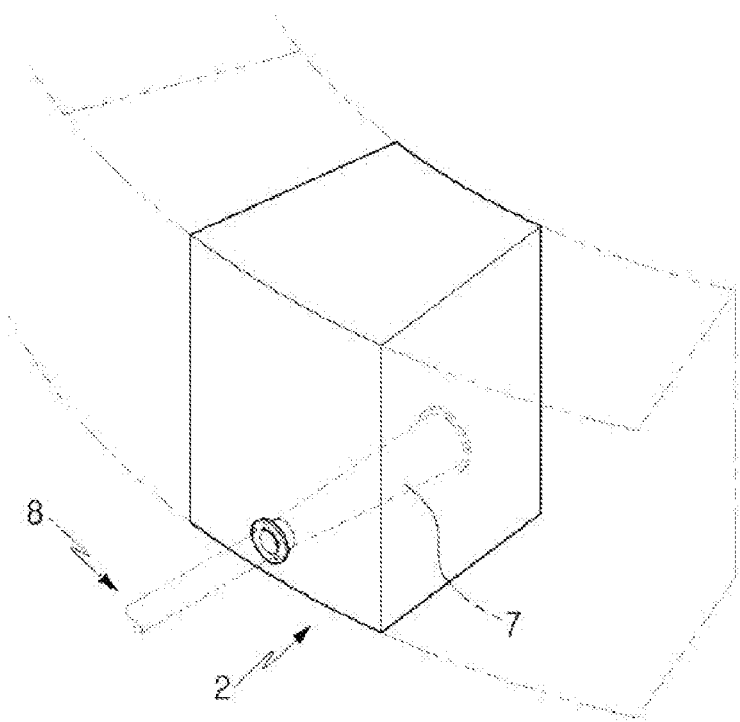
FIG. 3 is a perspective view showing a configuration of the metal heat storage medium applied to the present invention.

FIG. 3 is a perspective view showing a configuration of the metal heat storage medium applied to the present invention. The metal heat storage medium 2 is manufactured with unit members in a casting state, by melting a metal scrap or the like. Here, a processing chip or various sizes of metal pieces can be used again as the metal scrap, so that manufacturing cost is minimized.

The unit member-type metal heat storage medium 2 provided by the present invention may be stacked in the shape of a quadrangular block. At least one solar heater 7 is installed in the metal heat storage medium 2. It is shown in the present invention that one solar heater 7 is installed in the metal heat storage medium 2.

The metal heat storage media 2 is disposed in a ring-type and has a multi-layer structure by being stacked. In the embodiment of the present invention, about 50 metal heat storage media 2 are arranged in a ring-type and stacked in the form of 7 layers.

The medium insertion chamber 3 insulating primarily the metal heat storage medium 2 is composed of the insulating inner wall 32, the insulating outer wall 33, and the insulating floor 34. The insulating inner wall 32, the insulating outer wall 33, and the insulating floor 34 constitute the 4-layered inner insulating wall body 31.

Figure 4:
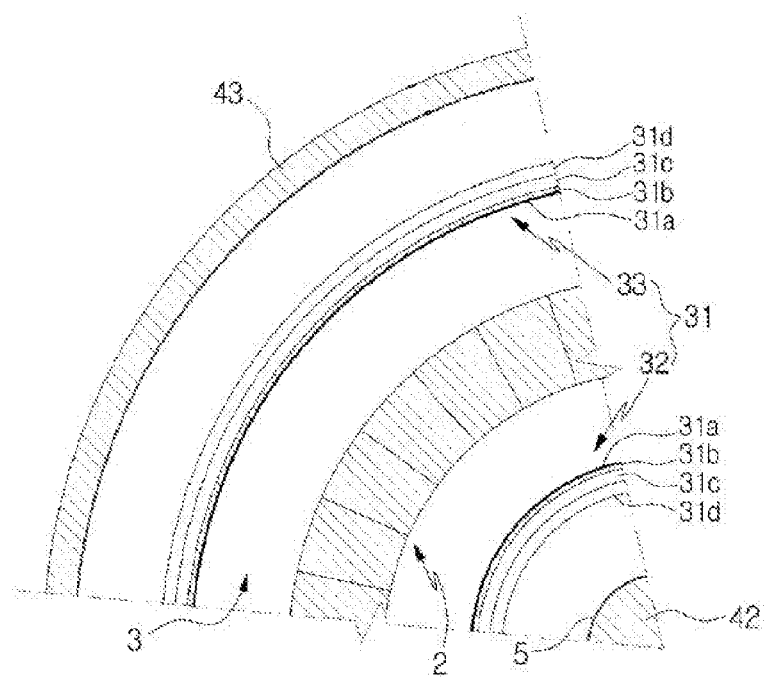
FIG. 4 is an expanded sectional view showing a configuration of an inner insulating wall body constituting a medium insertion chamber applied to the present invention.

FIG. 4 is an expanded sectional view showing a configuration of the inner insulating wall body constituting the medium insertion chamber applied to the present invention. The 4-layered inner insulating wall body 31 is, as shown in the drawing, configured by stacking an infrared reflective metal mirror 31a, a high-density fire-proof thermal insulating material 31b, a porous fire-proof thermal insulating material 31c, and an excellently heat resistant fire-proof thermal insulating material 31d. Additionally, the infrared reflective metal mirror 31a is disposed closer to the metal heat storage medium 2.

In the inner insulating wall body 31 of the embodiment of the present invention, which is configured as described above, the high temperature infrared rays provided from the metal heat storage medium 2 is reflected again to the metal heat storage medium 2, by the infrared reflective metal mirror 31a, and then the metal heat storage medium 2 is heated again. Also, the metal heat storage medium 2 is surrounded by the multiple layers including the high-density fire-proof thermal insulating material 31b, the porous fire-proof thermal insulating material 31c, and the fire-proof thermal insulating material 31d, etc., which has an excellent heat resistance, so that the heat is prevented from being lost to the outside, thereby providing a functionality to maintain the latent heat of the metal heat storage medium 2 for a long period of time without the loss of the heat.

The outer wall structure 4 outside the medium insertion chamber 3 is made of concrete. The outer wall structure 4 makes use of fireproof cement and includes a waterproof agent, thereby preventing moisture from being absorbed while installed outdoors.

The outer wall structure 4 maintains being completely blocked from the outside air in a case where the upper cover 44 has been closed. Also, the outer wall structure 4 becomes a vacuum state by reducing the pressure of the interior space if necessary, so that it is possible to prevent that the metal is oxidized by a high temperature and prevent the convection and thermal conductivity of air. As a result, the loss of the heat can be prevented.

The infrared rays reflecting mirror 5 installed below the upper cover 44 of the outer wall structure 4 again reflects the high temperature infrared rays provided from the metal heat storage medium 2 to the metal heat storage medium 2. Also, a fire-proof thermal insulating material 9 is installed between the upper cover 44 and the infrared rays reflecting mirror 5. Here, the inside of the outer wall structure 4 maintains the vacuum state, so that the internal insulation can be more improved and the loss of the heat can be reduced.

The lighter fire-proof thermal insulating material 9 is chosen, and preferably, an aerogel type fire-proof thermal insulating material may be used.

Figure 5:
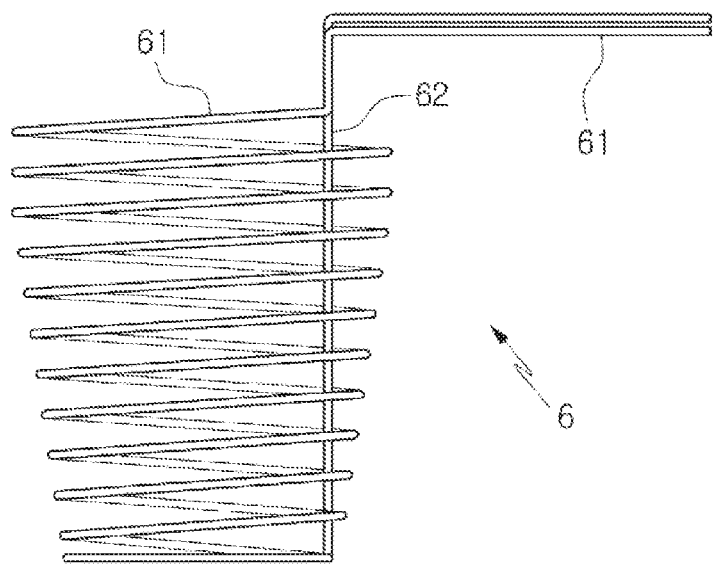
FIG. 5 is a front view showing a configuration of a heat exchanger applied to the present invention.

FIG. 5 is a front view showing a configuration of the heat exchanger applied to the present invention.

The heat exchanger 6 is spirally disposed inside the metal heat storage medium 2 and allows heat exchange to be performed. The heat exchanger 6 has a narrow lower portion thereof. The heat exchanger 6 gradually becomes wider toward the top thereof. The supply tube 61 is disposed in the upper portion thereof closer to the metal heat storage medium 2, and the drain tube 62 is disposed in the lower portion thereof further from the metal heat storage medium 2, so that fluid (water) can be heated.

A cool fluid flows into the supply tube 61 and is gradually heated while moving through the spirally formed heat exchanger 6, and then is discharged through the drain tube 62. The time for heat exchange is sufficiently maintained, so that the fluid can be heated at a high temperature.

In the embodiment of the present invention, the solar heater 7 and the high-density optical input port 8 which provides solar heat concentrated on the solar heater 7 are used as a means for heating the metal heat storage medium 2.

The solar heater 7 is formed to have a conical shape of which the diameter is gradually increased from the entrance thereof.

Figure 6:
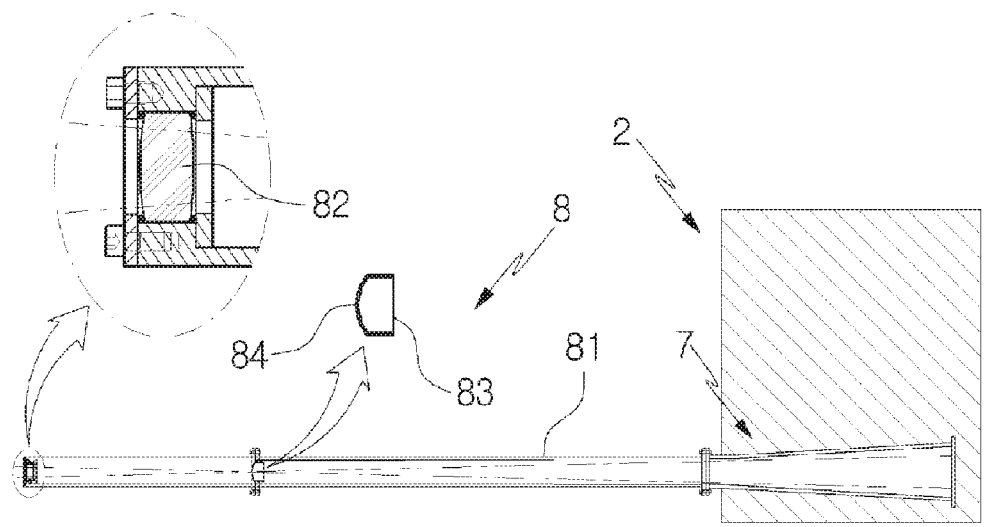
FIG. 6 is an expanded sectional view showing a configuration of a high-density optical input port applied to the present invention.

FIG. 6 is an expanded sectional view showing a configuration of the high-density optical input port applied to the present invention.

The high-density optical input port 8 includes a high temperature insulating pipe 81, a convex lens 82, and a reflective metal parabolic mirror 83. The high temperature insulating pipe 81 is installed to pass through the outer wall structure 4 and the inner insulating wall body 31 so as to be coupled to the solar heater 7. The convex lens 82 is coupled to the front end of the high temperature insulating pipe 81. The reflective metal parabolic mirror 83 is installed at the focal position of the convex lens 82 inside the high temperature insulating pipe 81 and includes a through-hole 84 formed in the center thereof.

The high temperature insulating pipe 81 may be made of a ceramic material, etc.

Through the above-mentioned configuration, the concentrated sunlight provided from the concentrator is again concentrated on the convex lens 82 and then is provided to the solar heater 7 through the through-hole 84 of the reflective metal parabolic mirror 83, so that the metal heat storage medium 2 is heated. Here, reflected light is generated from the solar heater 7. According to the embodiment of the present invention, since the reflective metal parabolic mirror 83 is installed within the high temperature insulating pipe 81, the light reflected from the solar heater 7 is again guided and provided to the solar heater 7, and then the metal heat storage medium 2 is heated. Accordingly, heatability can be more improved.

An undescribed reference numeral 100 in the drawings represents the solar tracking concentrator filed on the same day as that of the present invention.

Figure 7:
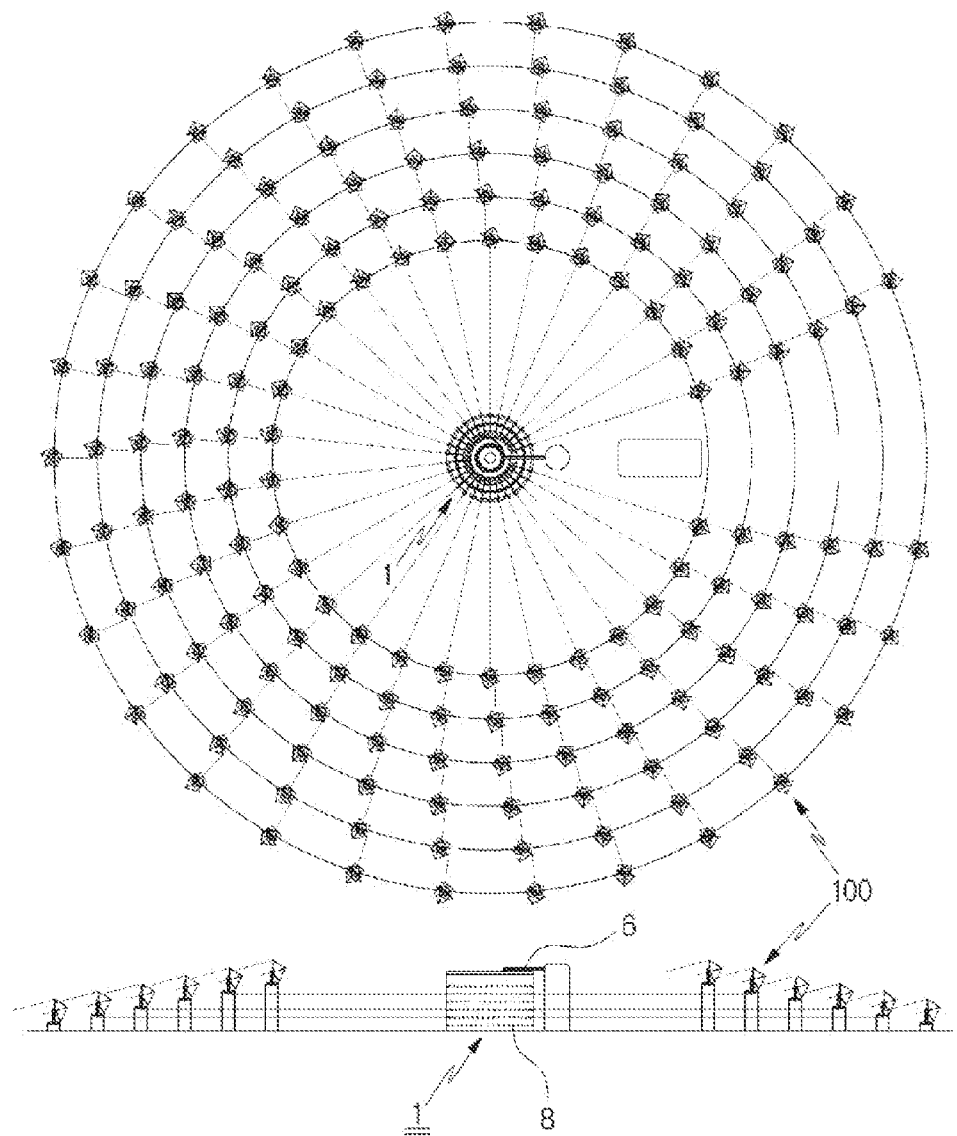
FIG. 7 shows a front cross-sectional view and a plan view which show a state where a number of solar concentrators of the present invention.

As shown in FIG. 7, the present invention can be used in conjunction with several or n number of the solar tracking concentrators 100. Hereafter, the operation according to the use of the embodiment of the present invention will be described.

When the concentrated sunlight energy is provided to the high-density optical input port 8 through the solar tracking concentrator 100, the light is again concentrated through the convex lens 82 installed on the front end of the high temperature insulating pipe 81 of the high-density optical input port 8, and then is provided to the solar heater 7 buried in the metal heat storage medium 2.

Here, since the focus is adjusted to the through-hole 84 formed in the reflective metal parabolic mirror 83 installed in the middle of the high temperature insulating pipe 81, the sunlight concentrated by the convex lens 82 passes through the through-hole 84 of the reflective metal parabolic mirror 83, and then is gradually diffused and heats the solar heater 7.

As the solar heater 7 is heated, the metal heat storage medium 2 is heated. Here, a temperature higher than 200 degrees, as high as 1200 to 1300 degrees is provided to the solar heater 7 in accordance with the size of the solar tracking concentrator 100, thereby heating the metal heat storage medium 2 in a casting state.

The metal heat storage medium 2 which is heated at a high temperature of 200 to 1300 degrees is formed by melting an iron scrap and the like. The metal heat storage medium 2 is able to store the heat within a range of the melting point (1538 degrees) of the iron metal. Therefore, it is possible to provide high thermal storability while the metal heat storage medium 2 becomes smaller.

Also, regarding the thermal energy stored in the metal heat storage medium 2, since the metal heat storage medium 2 is doubly surrounded by the 4-layered inner insulating wall body 31 and the outer wall structure 4 made of concrete, the loss of the heat of the metal heat storage medium 2 can be minimized and the long-term storage of the heat is allowed. Accordingly, when the metal heat storage medium 2 is once heated at a high temperature, the metal heat storage medium 2 cannot be cooled without additionally heating for at least several days.

Meanwhile, in the embodiment of the present invention, the heat exchanger 6 is spirally disposed inside the metal heat storage medium 2. Therefore, a cool fluid flows into the supply tube 61 and is gradually heated while moving through the spirally formed heat exchanger 6, and then is discharged through the drain tube 62. The time for heat exchange is sufficiently maintained, so that the fluid can be heated at a high temperature.

Comparison Example amount of energy stored by 1 m$^3$ of water=specific heat (1)×unit weight (1 cm$^3$×specific gravity 1)×1000×rising temperature (90° C.−40° C.=50° C.; when the water is heated at 90° C. and not boiled: 40° C. is a heat exchangeable temperature)=50000 cal amount of energy stored by 1 m$^3$ of iron=specific heat (0.108)×unit weight (1 cm$^3$×specific gravity 7.876)×1000×rising temperature (1200° C.−40° C.=1160° C.; when the iron is heated at 1200° C.)=977184 cal As described above, it is possible to obtain the heat storage about 20 times as much as that of water used as the storage medium. The present invention can be applied to the home boiler. When the metal heat storage medium 2 is configured to have the volume of the water used as the storage medium, the present invention can be applied for the heating in winter, and thus, the heating can be performed by using the solar energy, i.e., natural energy.

Meanwhile, regarding molten salt, PCM materials, and thermal oil which have been used in the past, the heat storage temperature is lower than that of the present invention. Also, since the molten salt, PCM materials, and thermal oil have been manufactured by producing chemical materials, they have a shorter life span due to oxidation through the long-term use thereof. However, since the present invention includes the metal heat storage medium 2 in a casting state, it can be permanently used by performing an oxidation resistant treatment on only the surface, and the like.

While the specific embodiment of the present invention has been described in detail, various modifications and changes of the embodiment can be made without departing from the spirit and scope of the present invention. Therefore, the scope of the present invention should not be limited to the foregoing embodiment and should be defined by the following claims and equivalents thereto.

INDUSTRIAL APPLICABILITY

The metal heat storage apparatus provided by the present invention can be applied to the home solar heat boiler, industrial solar heat boiler, and heat storage device for power generation, etc.

What is claimed is:

1. A metal heat storage apparatus comprising:
   a metal heat storage medium (2);
   a medium insertion chamber (3) is formed by disposing an insulating inner wall (32), an insulating outer wall (33) and an insulating floor (34), each of which is made of an inner insulating wall body 31 so as to insulate the metal heat storage medium (2), on the inner side, outer side and the floor, respectively, of the metal heat storage medium (2);
   an outer wall structure (4) which is made of concrete to further insulate the metal heat storage medium (2) and includes a floor (41), a central column (42) an outer wall body (43), and an upper cover (44);
   an infrared ray reflecting mirror (5) which is disposed below the upper cover (44) constituting the outer wall structure (4) and reflects infrared rays generated from the metal heat storage medium (2);
   a heat exchanger (6) which is spirally disposed inside the metal heat storage medium (2) and includes a supply tube (61) and a drain tube (62) which are exposed to the outside of the outer wall structure (4);
   a solar heater (7) which is buried in the metal heat storage medium (2); and
   a high-density optical input port (8) which is installed to pass through the outer wall body (43) and the insulating outer wall (33) so as to provide the solar energy to the solar heater (7).

2. The metal heat storage apparatus of claim 1, wherein the metal heat storage medium (2) is composed of a block type in a casting state.

3. The metal heat storage apparatus of claim 1, wherein the inner insulating wall body (31) comprises an infrared reflective metal mirror (31a), a high-density fire-proof thermal insulating material (31b), a porous fire-proof thermal insulating material (31c), and a fire-proof thermal insulating material (31d), wherein the infrared reflective metal mirror (31a) is disposed in a direction of the metal heat storage medium (2).

4. The metal heat storage apparatus of claim 1, wherein the outer wall structure (4) and is made of concrete comprising a waterproof agent.

5. The metal heat storage apparatus of claim 1, wherein an upper fire-proof thermal insulating material (9) is further disposed between the upper cover (44) of the outer wall structure (4) and the infrared ray reflecting mirror (5) installed below the upper cover (44), wherein the fire-proof thermal insulating material (9) is light and has an aerogel type.

6. The metal heat storage apparatus of claim 1, wherein the high-density optical input port 8 comprises a high temperature insulating pipe (81), a convex lens (82) and a reflective metal parabolic mirror (83), wherein the high temperature insulating pipe (81) is installed to pass through the outer wall structure (4) and the inner insulating wall body (31) so as to be coupled to the solar heater (7), wherein the convex lens (82) is coupled to the front end of the high temperature insulating pipe (81), and wherein the reflective metal parabolic mirror (83) is installed at the focal position of the convex lens (82) inside the high temperature insulating pipe (81) and includes a through-hole (84) formed in the center thereof.

* * * * *